United States Patent [19]
West et al.

[11] Patent Number: 5,285,542
[45] Date of Patent: Feb. 15, 1994

[54] MATTRESS COVER

[76] Inventors: Gordon W. West, 35 Peel Village Parkway, Brampton, Ontario, Canada, L6W 1G1; Roy D. Moss, 5941 Midiron Cir., Huntington Beach, Calif. 92649

[21] Appl. No.: 28,868
[22] Filed: Mar. 10, 1993
[51] Int. Cl.⁵ ................. A47C 31/00; B32B 15/00
[52] U.S. Cl. ................................. 5/500; 5/502; 5/421; 5/422; 428/285
[58] Field of Search .......... 5/500, 502, 421, 422, 5/483, 459, 470, 471; 428/74, 76, 285, 287

[56] References Cited

U.S. PATENT DOCUMENTS

| | | |
|---|---|---|
| 2,726,977 | 12/1955 | See et al. |
| 2,801,427 | 8/1957 | Crocker |
| 3,818,521 | 6/1974 | Richards, Jr. ............ 5/459 |
| 3,833,951 | 9/1974 | Hurwitz .................. 5/459 |
| 4,420,521 | 12/1983 | Carr ...................... 428/74 |
| 4,525,406 | 6/1985 | Pollock ............... 428/285 X |
| 4,549,323 | 10/1985 | Brockhaus |
| 4,637,947 | 1/1987 | Maekawa et al. |
| 4,754,514 | 7/1988 | Limb et al. |
| 4,980,228 | 12/1990 | LaMarco, II et al. ..... 428/285 |
| 5,023,970 | 6/1991 | Tesch |
| 5,092,006 | 3/1992 | Fogel |
| 5,161,271 | 11/1992 | Gronbach ............... 5/422 X |
| 5,204,172 | 4/1992 | Gidley ................. 428/285 X |

*Primary Examiner*—Michael F. Trettel
*Attorney, Agent, or Firm*—Moss, Barrigar & Oyen

[57] ABSTRACT

A mattress pad or cover is disclosed for a conventional inner-spring or foam type mattress. The mattress cover has a quilted cover portion and a downwardly depending peripheral skirt that wraps around the mattress to hold the cover portion in place. The skirt has elastic sewn around its lower peripheral edge to keep the skirt tucked under the mattress. The cover portion has a first thick layer of fiberfill and a second conterminous thin layer of fiberfill. A metalized film is needle-punched to the thin fiberfill layer and a fabric cover envelops a fiberfill and film layers.

17 Claims, 3 Drawing Sheets

MATTRESS COVER

This invention relates to mattress covers or pads, and in particular, to mattress covers for conventional inner-spring mattresses, as opposed to waterbed mattresses.

BACKGROUND OF THE INVENTION:

Mattress pads are used to cover bed mattresses for several reasons. One is to keep the bed mattress clean. Another is to improve the feel or softness of the mattress. Most mattress pads in the past have been made of quilted ticking using fillers of various types, such as down, feathers, wool, natural or synthetic fibers and natural or synthetic foam rubber. While these mattress covers have worked reasonably well, some variations have been proposed to meet certain perceived needs.

An example of this is shown in U.S. Pat. No. 5,092,006 issued to Fogel, where an additional insulating pad is used in a waterbed application in addition to an ordinary mattress ticking cover. A problem with waterbed mattresses is that the water in the waterbed bladder acts as a heat sink. This can be uncomfortably cold to sleep on, so extra insulation is thought to be necessary or heaters must be used to keep the water warm. Most insulating pads for waterbeds have employed foam rubber layers to give the desired insulating effect. The Fogel patent, however, shows the use of an extra pad with metalized polyethylene film as an insulating layer in addition to foam layers. A difficulty with this extra pad in the Fogel construction, however, is that the foam rubber makes the pad non-washable. A mattress pad or cover for a mattress needs to be able to be laundered or washed, for obvious reasons. Further, the metalized film causes a condensation problem which results in mildew and odors, so the metalized film is actually undesirable.

The extra insulation needed for waterbed mattresses heretofore has not been thought to be necessary for conventional non-waterbed mattresses, because ordinary mattresses do not feel cold to the user. An insulating mattress cover has been used on an ordinary mattress in the past, however, but for a different purpose. U.S. Pat. No. 2,801,427 issued to Crocker shows a cover to make the mattress fireproof. It has a central aluminum foil sheet sandwiched between glass fiber mineral wool layers. Outer waterproof layers cover the glass fiber layers to make the pad waterproof and readily cleanable. A difficulty with the Crocker mattress pad, however, is that moisture or condensation will form on the surfaces of the pad making the sheets and bedding feel damp and clammy and also cause a mildew and odor problem. In addition, the aluminum foil in Crocker would make the pad very noisy to sleep on. Unless fireproofing is considered to be necessary, the Crocker mattress cover would actually be undesirable for ordinary mattresses.

Surprisingly, the present inventors have found that a metalized film can be used in a mattress cover without a moisture buildup problem and still produce a cover which is washable and not noisy to sleep on.

SUMMARY OF THE INVENTION

The present invention provides a washable mattress cover that has the insulating properties of a metalized film yet avoids the condensation buildup and noise problems of prior art mattress pads.

According to one aspect of the invention, there is provided a mattress cover comprising a first thick layer of fiberfill and a second conterminous thin layer of fiberfill. A metalized film is attached to the thin fiberfill layer facing the thick fiberfill layer, and an air-permeable cover envelops the fiberfill and film layers.

According to another aspect of the invention, there is provided a mattress cover comprising a first layer of fiberfill and a second conterminous layer of fiberfill. A metalized film is needle-punched to the second layer of fiberfill, and an air-permeable cover envelops the fiberfill and film layers.

DESCRIPTION OF THE DRAWINGS

Preferred embodiments of the invention will now be described, by way of example, with reference to the accompany drawings, in which.

DETAILED DESCRIPTION OF THE PREFERRED EMBODIMENTS

Figure 1:
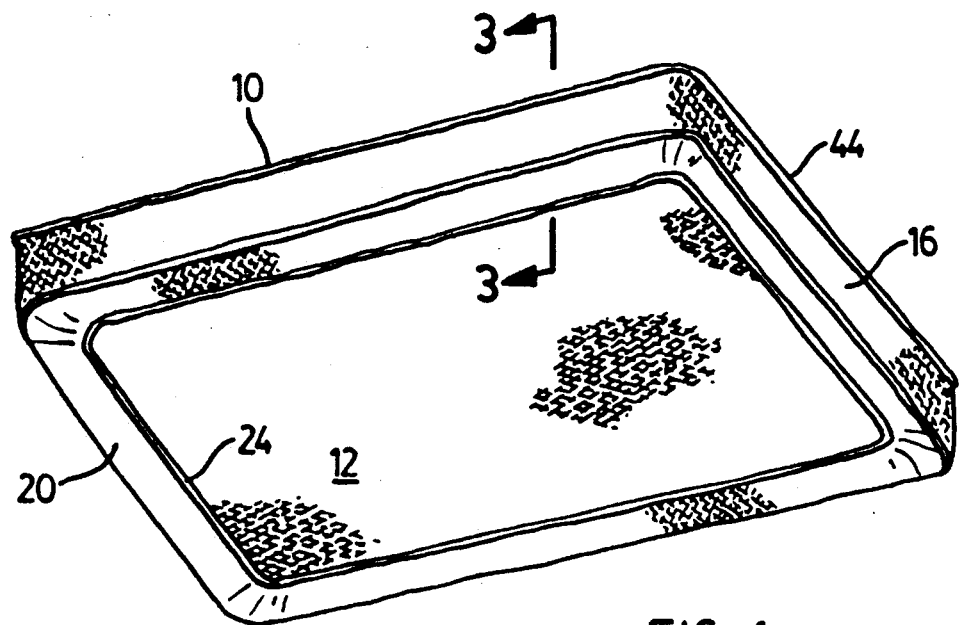
FIG. 1 is a perspective view taken from below showing a preferred embodiment of a mattress cover according to the present invention mounted on a mattress.

Referring to the drawings, a preferred embodiment of a mattress pad or cover according to the present invention is generally indicated in the drawings by reference numeral 10. Mattress cover 10 is shown in FIG. 1 fitted onto a mattress 12. Mattress 12 is a conventional mattress of the inner-spring or foam type as opposed to a waterbed mattress, but cover 10 could be used with any type of mattress. The construction of mattress 12 is conventional and is not considered to be part of the present invention, so will not be described in further detail herein.

Mattress cover 10 has a top or main cover portion 14 that lies on top of mattress 12, and a downwardly depending peripheral skirt 16 that extends down the sides 18 of mattress 12 and wraps around or tucks under mattress 12. As seen best in FIG. 1, skirt 16 has an inwardly directed lower peripheral edge portion 20. Elastic 22 (see FIG. 3) is sewn into the hem 24 of edge portion 20 by means of stitching 26 to pull edge portion 20 inwardly. This makes skirt 16 fit snugly around mattress 12 and holds cover portion 14 in place on top of mattress 12. Skirt 16 is formed of a suitable mesh or netting material, but it could be any fabric desired.

Figure 2:
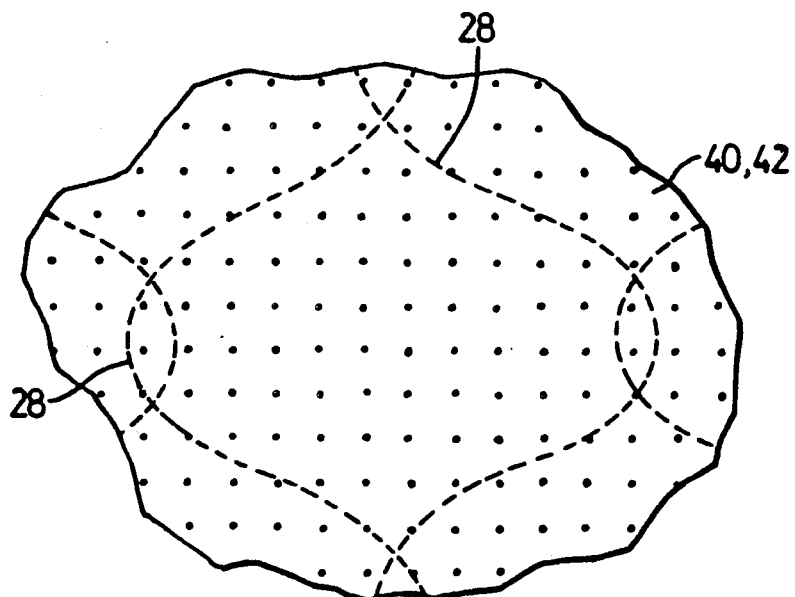
FIG. 2 is an enlarged plan view showing a portion of the top quilted surface of the mattress cover of FIG. 1.

Cover portion 14 is formed of multiple layers quilted together by stitching 28 as seen best in FIG. 2. Any pattern of stitching could be used, such as parallel lines or a criss-cross square or diamond pattern as desired. The main layer in cover portion 14 is a first thick layer of fiberfill 30. This is a non-woven, polyester fiber layer preferably between 2 and 4 centimeters in thickness before it is quilted into cover portion 14. Any natural or synthetic fiber could be used for first layer 30 as long as it is capable of being washed or laundered.

A second thin layer 32 of fiberfill is conterminous with or overlies first layer 30. Second layer 32 is also preferably formed of non-woven, polyester fiber. However, hollow fiber is preferably used for second layer 32 and solid fiber is preferably used for first layer 30.

Again, any type of natural or synthetic fiber could be used for second layer 32 as long as it is capable of being washed or laundered. The thickness of second layer 32 prior to being quilted into cover portion 14 is preferably between 3 and 5 millimeters.

A metalized film layer 34 is attached to second layer 32 by needle punching the two layers together prior to assembling same into cover portion 14. Metalized film 34 includes a first clear polyethylene or polyurethane substrate or film 36 upon which aluminum or some other metal coating 38 is vapor deposited or sputtered or otherwise applied to film 36. Film 36 is typically 1 to 2 mils in thickness, but thinner film is preferable provided that it does not tear apart in use. It will be noted that the metalized coating 38 is adjacent to second layer 32 in the embodiment shown in FIG. 3, but metalized film 34 could be turned over so that coating 38 is adjacent to first layer 30. For the purposes of this disclosure, either way, metalized film 34 is considered to be attached to the second thin fiberfill layer so that it faces the first or thick fiberfill layer 30 in the FIG. 3 embodiment.

An air-permeable cover envelops the fiberfill layers 30, 32 and the metalized film 34. This air-permeable cover includes an upper fabric layer 40 which could be a polyester or cotton cloth or a blend of polyester and cotton or any other washable fabric. The cover also includes a lower or bottom fabric layer 42, which again could be a polyester or cotton cloth, mattress ticking, or any other washable fabric. A hem 44 around the peripheral edge of cover portion 14 attaches skirt 16 to cover portion 14 by stitching 46 as seen best in FIG. 3.

Figure 3:
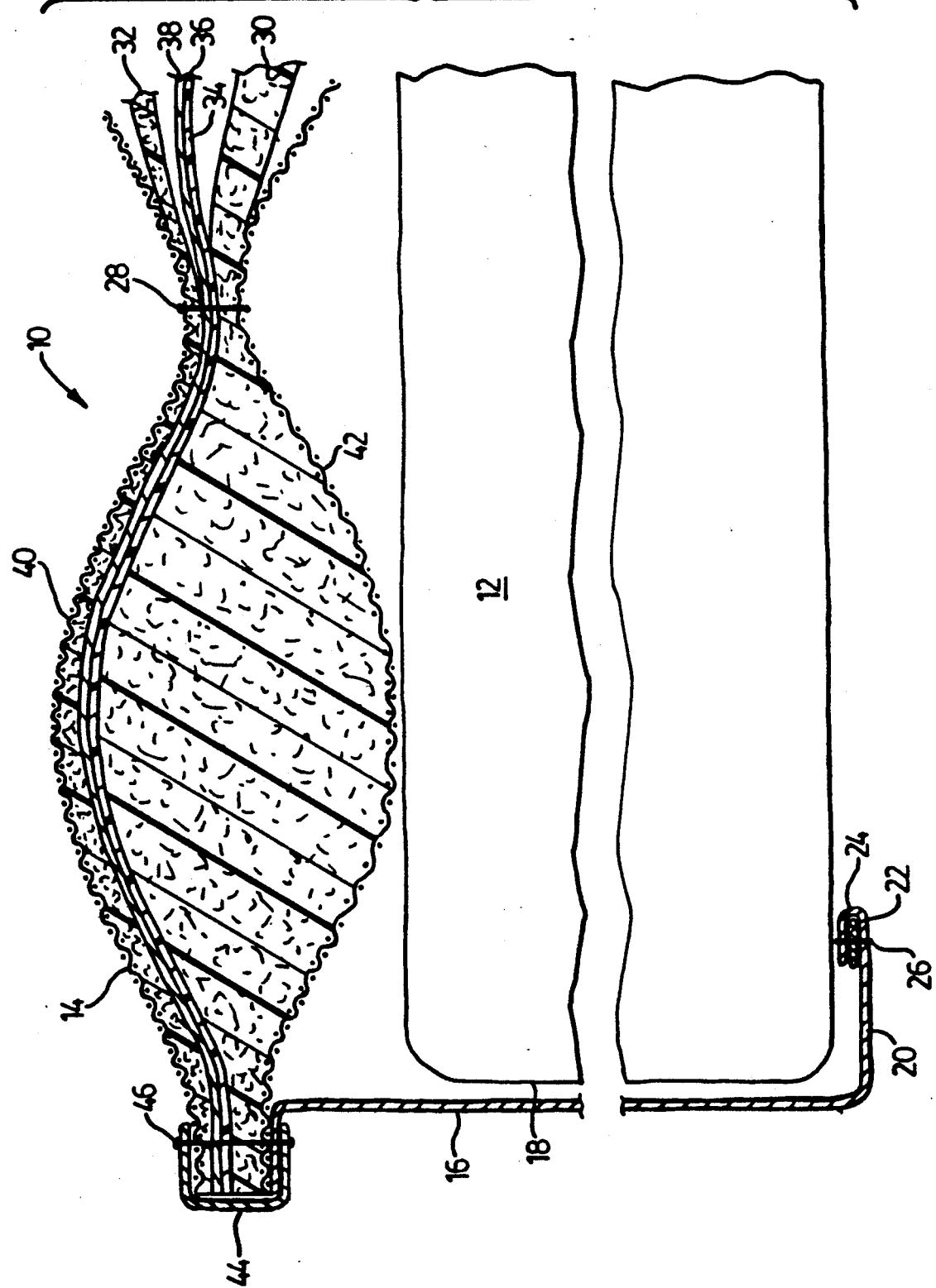
FIG. 3 is an enlarged sectional view of the mattress cover taken along lines 3—3 of FIG. 1.

Mattress cover 10 is shown in FIG. 3 having first layer 30 located below second layer 32. In this configuration, metalized film 34 is close to the top surface of cover portion 14 to give the maximum insulating effect. However, mattress cover 10 is reversible in that cover portion 14 can be turned over so that skirt 16 extends over hem 44 in the direction of second layer 32. In other words, metalized film 34 would then be closest to mattress 12. In this orientation, mattress cover 10 would give little or minimum insulating effect. This minimum insulating effect can be further decreased by making the polyethylene film 36 out of opaque or colored material to absorb heat rather than reflect it. The mattress cover would then feel cool to the user. In the winter, mattress cover 10 would be put on mattress 12 so that metal coating 38 is closest to the upper surface making mattress cover 10 feel warm to the user, and in the summer, the mattress cover would be reversed so that metal coating 38 is remote from the user or blocked by an opaque film 36, making mattress cover 10 feel cool to the user. In either case, the fiberfill layers 30, 32 allow mattress cover 10 to "breathe" to avoid moisture condensation buildup. The fact that metalized film 34 is needle-punched to second layer 32 allows the metallized film 34 to "breathe".

Figure 4:
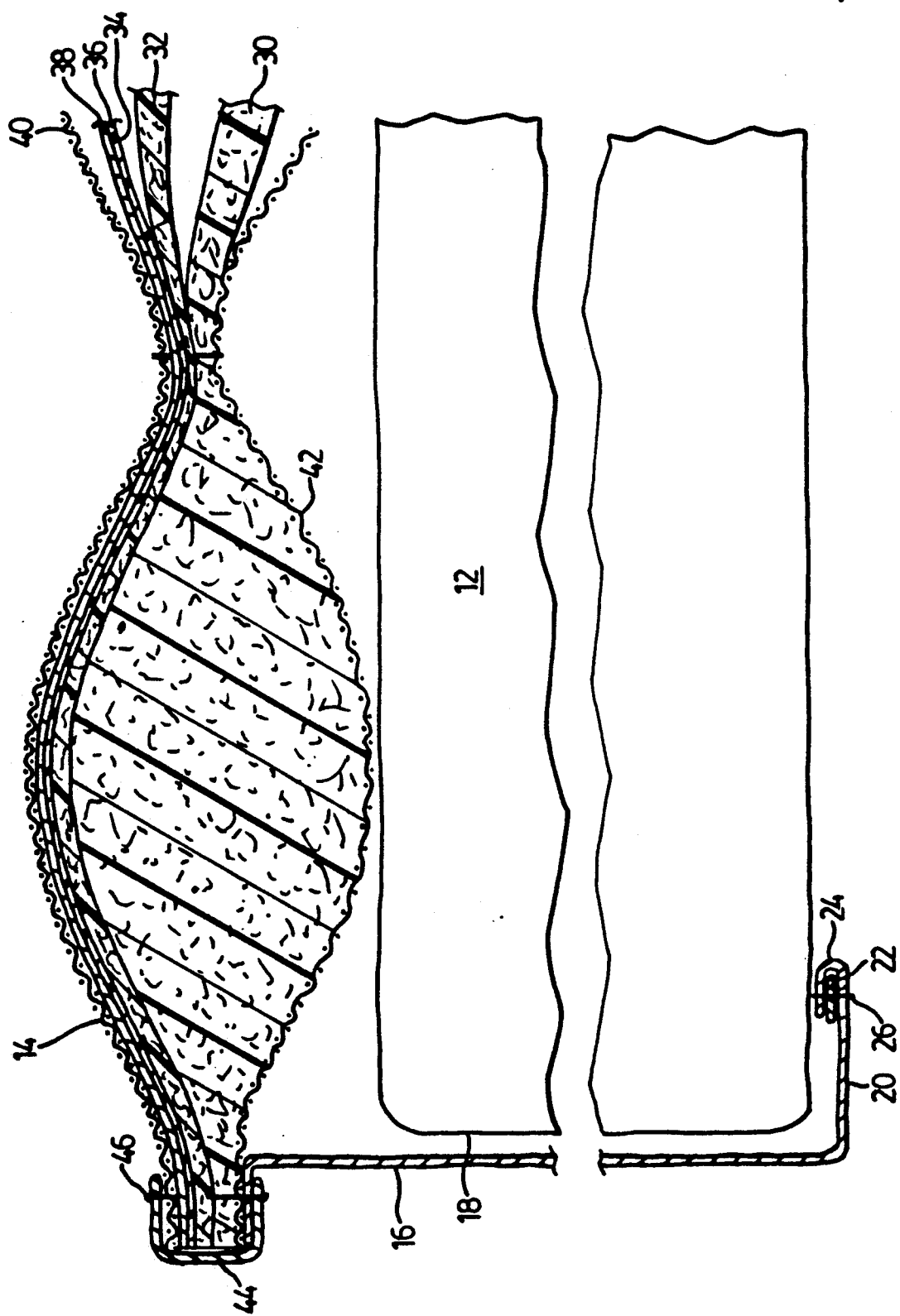
FIG. 4 is a view similar to FIG. 3, but showing another embodiment of a mattress cover according to the present invention.

Referring next to FIG. 4, like reference numerals have been used to indicate parts similar to those of FIG. 3. In the FIG. 4 embodiment, the needle-punched combined layer including second layer 32 and metalized film 34 has been reversed or turned upside down, so the metal coating 38 faces the upper fabric layer 40 rather than first fiber layer 30. The needlepunching again makes the film 34 breatheable to prevent condensation buildup, since some of the fiber of the fiberfill layer 32 passes through the holes in film 34 caused by the needle-punching operation.

From the above, it will be appreciated that the present invention provides a washable mattress cover that is breathable, so that there is no condensation or moisture problem in use. Also, the cover is reversible to give more or less insulation making the cover feel warmer or cooler to the user as desired.

It will be apparent to those skilled in the art that in light of the foregoing disclosure, many alterations and modifications are possible in the practise of this invention without departing from the spirit or scope thereof. Accordingly, the scope of the invention is to be construed in accordance with the substance defined in the following claims.

We claim:

1. A mattress cover comprising:
   a first thick layer of fiberfill;
   a second conterminous thin layer of fiberfill;
   a metalized film attached to the thin fiberfill layer facing the thick fiberfill layer; and an air-permeable cover enveloping the fiberfill and film layers.

2. A mattress cover as claimed in claim 1 wherein the metalized film is attached to the thin fiberfill layer by needle-punching.

3. A mattress cover as claimed in claim 2 wherein the film, the cover and the fiberfill layers are quilted together.

4. A mattress cover as claimed in claim 2 wherein the thickness of the second fiberfill layer is between 3 and 5 millimeters.

5. A mattress cover as claimed in claim 4 wherein the second fiberfill layer is formed of hollow fibers.

6. A mattress cover as claimed in claim 4 wherein the second fiberfill layer is formed of polyester fiber.

7. A mattress cover as claimed in claim 2 wherein the thickness of the first fiberfill layer is between 2 and 4 centimeters.

8. A mattress cover as claimed in claim 7 wherein the first fiberfill layer is formed of polyester fiber.

9. A mattress cover as claimed in claim 3 wherein the cover has a peripheral, transverse skirt for wrapping around a mattress.

10. A mattress cover as claimed in claim 1 wherein the metallized film is an aluminized polyethylene sheet.

11. A mattress cover as claimed in claim 10 wherein the polyethylene sheet is formed of opaque polyethylene.

12. A mattress cover comprising:
    a first layer of fiberfill;
    a second conterminous layer of fiberfill;
    a metalized film needle-punched to the second layer of fiberfill; and
    an air-permeable cover enveloping the fiberfill and film layers.

13. A mattress cover as claimed in claim 12 wherein the first fiberfill layer is thicker than the second fiberfill layer.

14. A mattress cover as claimed in claim 12 wherein the metalized film is disposed facing the air-permeable cover.

15. A mattress cover as claimed in claim 12 wherein the second fiberfill layer is formed of hollow fibers.

16. A mattress cover as claimed in claim 12 wherein the fiberfill layers are formed of polyester fiber.

17. A mattress cover as claimed in claim 12 wherein the metallized film is an aluminized polyethylene sheet.

* * * * *